INVENTOR.
RENE C. REMY
BY
ATTORNEY

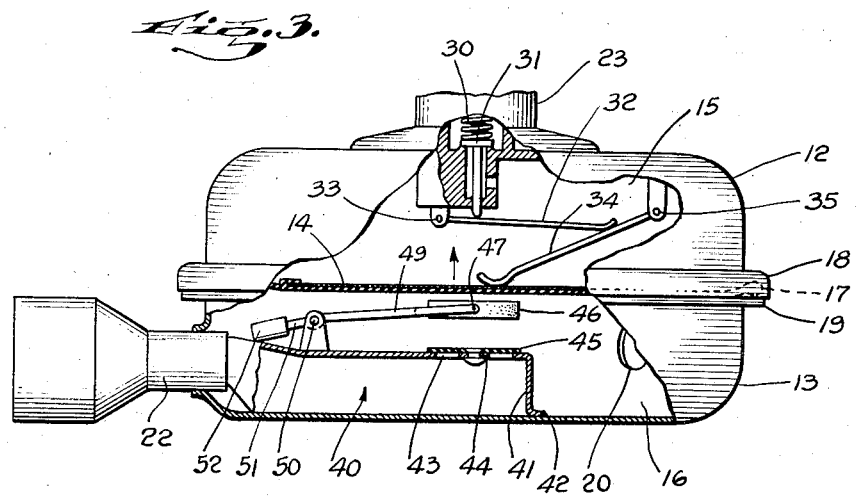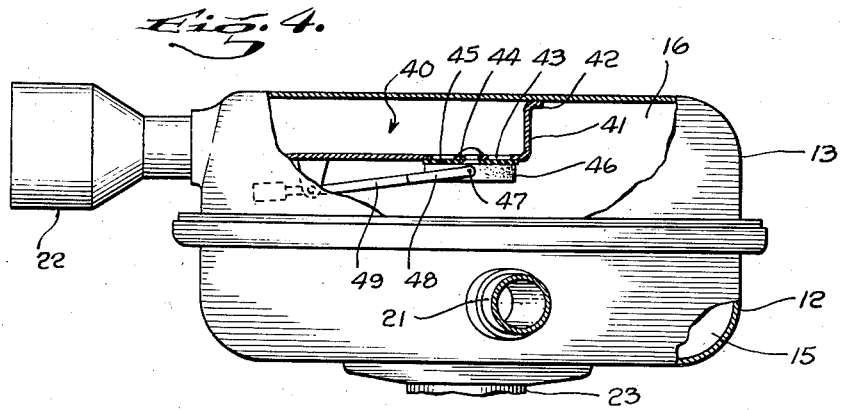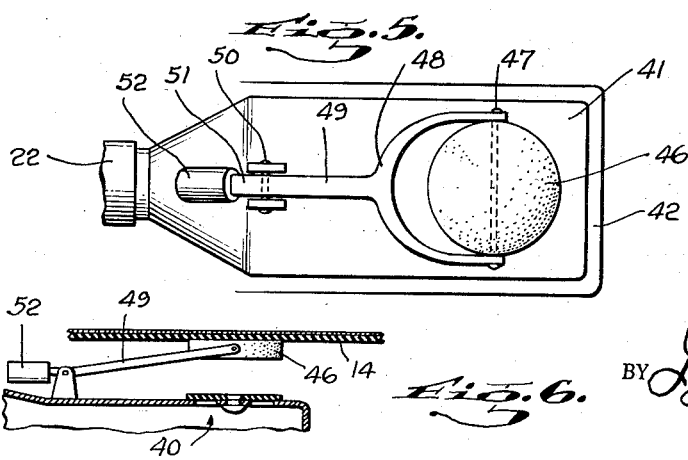

2,872,922

BREATHING REGULATOR WITH EXHALATION VALVE ASSISTED BY GRAVITY RESPONSIVE MEANS

René Charles Rémy, Paris, France

Application November 26, 1957, Serial No. 699,003

6 Claims. (Cl. 128—142)

This invention relates to underwater breathing apparatus of the open circuit type used by divers, wherein air from a high pressure container is supplied to the diver's lungs through a fitting that is attached to the diver's face, such as a mouthpiece or mask, an inhalation tube and a regulator including a demand-responsive inhalation valve mechanism for controlling the flow of the air at the proper pressure to balance the ambient hydrostatic pressure of the surrounding water at the depth at which the diver is operating; and wherein the waste gases including spent air and carbon dioxide from the diver's lungs are exhausted through the same mouthpiece and through an exhalation tube and valve; the regulator apparatus including both the inhalation and exhalation valve mechanism and controlling the inhalation and exhalation operations in response to the inhaling and exhaling effort of the diver's lungs.

Hitherto in this general type of regulator it has been considered necessary to locate the exhalation valve fairly close to the operative center of the diaphragm which controls the inhalation valve, in order to maintain proper control of exhalation without imposing too much of a strain upon the diver's lungs while assuring the proper closing of the exhalation valve upon cessation of exhalation flow from the diver's lungs, regardless of whether the regulator is in a normal upright position (upon the diver's back when normally face downward) or in an inverted position as when the diver turns over to face upwardly. In this respect it will be understood that in the normal position the exhalation valve in the usual breathing apparatus is above the level of the operative center of the diaphragm whereas in the inverted position it is an equal distance below that point. It will be obvious that some differential of ambient pressure over the normal mouthpiece pressure at the cessation of exhalation, will be required in order to effectively close the exhalation valve which is normally of the check valve type, responding to a pressure differential in the exhalation tube for opening the same. It is the practice in this common type of breathing apparatus to adjust the apparatus so that the diver's lungs, in order to open the exhalation valve during the exhalation effort, must exert a pressure differential which is directly related to the pressure necessary for operating the diaphragm sufficiently to open the inhalation valve during the inhalation effort, i. e., the exhalation valve is so positioned that the distance between it and the operative center of the diaphragm is less than the height of a column of water representing the pressure differential necessary for operating the diaphragm for inhalation. The inhalation valve apparatus is adjusted so as to require only a substantially minimum effort which will not be tiring upon the diver's lungs. In this conventional breathing apparatus, according to the formula stated above, the distance between the pressure sensitive mouth of the exhalation valve and the operative center of the diaphragm as measured in terms of a water column, represents even a smaller pressure differential, since, if it were greater, the pressure differential for holding the exhalation valve closed in the normal swimming position would be more than required whereas in the inverted position, the pressure differential would completely disappear and the exhalation valve would open automatically even during periods of inhaling effort, and would thus remain open constantly throughout the period of inverted swimming and would constantly leak air into the surrounding water.

It will be apparent that this formula for relating the position of the exhalation valve to the diaphragm, which is essential in the type of construction utilized in the conventional breathing apparatus, places fairly exacting limits upon the design characteristics of such apparatus, including the placement of parts and dimensions etc., and because of such close limits, the engineering and servicing requirements are fairly exacting and do not afford much latitude for an inexpensive type of production operation in the fabrication of the apparatus nor much latitude for variations in the adjustment of the apparatus without requiring servicing for readjusting the apparatus and restoring it to satisfactory operating condition.

With the foregoing problems in mind, this invention has as its general object to provide a breathing apparatus of the general type utilizing separate inhalation and exhalation valves in a regulator connected to a mouthpiece by separate inhalation and exhalation tubes in an open circuit arrangement, characterized by the provision of improved control means which eliminates the necessity for observing the formula for maintaining the exhalation valve within a limited distance from the operative center of the diaphragm.

More specifically, my invention aims to provide a breathing apparatus of this type embodying an improved exhalation valve which can be located at any selected distance from the operative center of the diaphragm.

Another object is to provide a breathing apparatus of the type outlined, embodying an improved exhalation valve which is adapted to control exhalation with a smaller requirement for exhalation effort on the part of the diver's lungs, thus making the apparatus easier and less tiring for the diver.

Other objects and advantages will become apparent in the ensuing specification and appended drawings in which:

Fig. 3 is a side view of the regulator with the exhalation chamber and exhalation valve thereof shown in section, in the normal operating position of the regulator;

Fig. 4 is a side view of the regulator in its inverted position of operation with the exhalation chamber broken away and the exhalation valve shown in section;

Fig. 5 is a plan view of the exhalation valve and its counterweight mechanism; and Fig. 6 is a fragmentary sectional view of a modified form of the invention.

Figure 1:
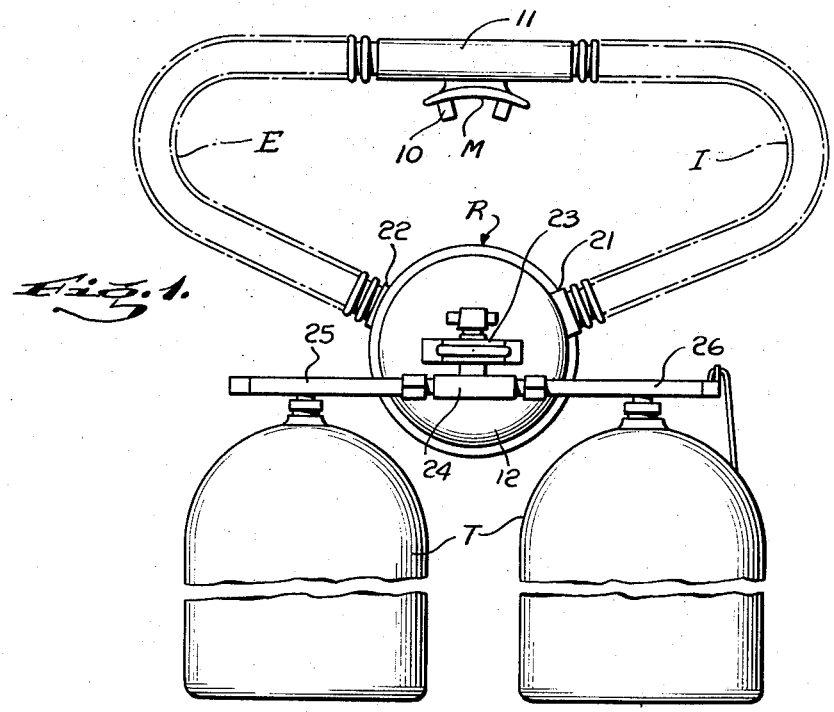
Fig. 1 is a schematic view of a breathing apparatus embodying the invention.
Figure 2:
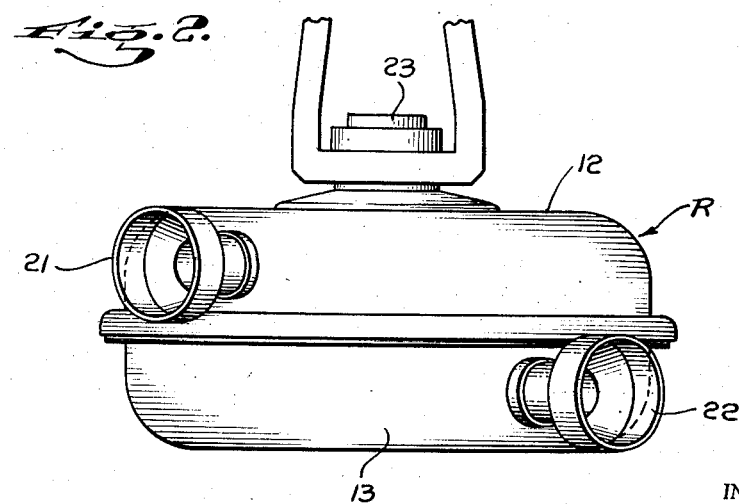
Fig. 2 is a side view of the regulator.

Referring now to the drawings in detail, and in particular to Fig. 1, I have shown therein, as an example of one form in which the invention may be embodied, a breathing apparatus embodying a regulator R, a mouthpiece M, an inhalation tube I connecting the mouthpiece to an inhalation metering demand valve unit in the regulator (customarily referred to as the regulator valve), and exhalation tube E connecting the mouthpiece to an exhalation valve in the regulator for supplying air under pressure thereto in response to the demand action of the regulator valve.

The mouthpiece M may be of the type commonly utilized in conventional breathing apparatus, including lugs 10 to be gripped between the diver's teeth for holding the mouthpiece in the diver's mouth; or may optionally be a face mask. The inhalation and exhalation tubes I and E are of lightweight flexible corrugated hose or conduit of waterproof material. The mouthpiece 10 is equipped with a T-head 11 the respective ends of which are coupled to the respective conduits I and E.

Regulator R (Fig. 3) embodies a casing assembly including respective drum-shaped casing sections 12 and 13 separated by a diaphragm 14 and defining therewith respective inhalation and exhalation chambers 15 and 16. In accordance with conventional construction, the rim 17 of the diaphragm may be clamped between rim flanges 18 and 19 on the respective casing sections, may be secured by suitable fastener devices (not shown) and may function as a gasket to seal the diaphragm to the casing sections, particularly to the section 12 so as to hermetically seal the chamber 15 from the surrounding medium. The exhalation chamber 16, in the operation of the regulator, is substantially filled with the surrounding water, which has free access to the chamber 16 through openings 20 in the casing section 13.

Secured in the lateral walls of the respective casing sections 12 and 13 are inlet and outlet connection fittings 21 and 22 respectively to which the ends of the respective conduits I and E are attached and sealed. Connected to the center of the end wall of casing section 12 and communicating with the inhalation chamber 15 is an air pressure supply fitting 23 to which is connected, through a T-fitting 24, the respective connecting tubes 25 and 26 for conveying air under pressure from the respective tanks T. Manual valves in the neck fittings of the respective tanks may be opened or closed as required in order to connect one or the other of the tanks to the regulator it being understood that it is customary to utilize a second tank as a reserve tank. The connections between the tanks and the air supply inlet of the regulator is conventional and forms no part of the present invention.

The inhalation valve mechanism, shown in Fig. 3, may be a conventional arrangement of a single demand valve in the form of a poppet valve 31 in the inlet 23, normally closed by any suitable means such as a spring 30, and a multiple stage lever actuator mechanism including a lever 32 to engage the stem of the poppet 31, one end of lever 32 being pivoted at 33 to the casing section 12 and the other end bearing against a second lever 34. Lever 34 has one end pivoted at 35 to the casing section 12 and its other end bearing against the inner face of diaphragm 14.

In lieu of the single demand valve 31 with its two-stage actuator lever mechanism, the invention may utilize a conventional arrangement of pressure reducing valve in inlet 23 and a demand valve for metering the air passed by the pressure reducing valve into the inhalation chamber 15, as disclosed in my co-pending application Serial No. 699,002, filed concurrently herewith. In any event, the inhalation valve mechanism must be such as to embody a slight closing pressure differential against the valve over the tank pressure at inlet 23, which differential is overcome by the pressure applied to the demand valve lever 44 by the diaphragm 14 in response to a reduction of pressure in the inhalation chamber 15 produced by the inhaling effort of the diver applied to that chamber through the inhaling connection 21.

In combination with a regulator valve mechanism of the general type outlined above, the present invention provides the improved exhalation valve mechanism which is indicated generally at 40 in the drawings. The exhalation valve mechanism 40 includes a throat 41 communicating with the exhalation outlet 22 and extending into the exhalation chamber 16. Throat 41, as indicated, may be defined between the head of housing section 13 and a stamping (Fig. 5) of channel section having a rim 42 extending along both sides thereof throughout its length and around its inner end and suitably attached and sealed to the housing section 13. At its inner end, throat 41 has a valve port 43 (which may comprise a series of apertures arranged in annular array in a spider section of the throat 41 having a central hub portion 44 to which is secured a valve element 45 in the form of a disc of thin flexible material, normally seated against the valve seat defined around the periphery of the port 43 and constituting what is commonly known as a diaphragm valve.

The valve 45 is arranged to open in the direction of the demand valve opening movement of diaphragm 14, indicated by arrow in Fig. 3, the valve seat facing in that direction. The valve 45 is spaced away from the plane of diaphragm 14 on the remote side thereof from the inhalation chamber 15. This is true regardless of whether the escape valve 45 is disposed, as shown in the drawing, substantially at the axis of the center of the diaphragm or in the position displaced from said axis in a radial direction. In fact, the invention makes it possible for the position of the exhalation valve to be located at any selected distance radially from the axis of the diaphragm so long as the escape valve is spaced axially from the plane of the diaphragm in the direction opposite to the direction of valve opening movement of the diaphragm 14. Preferably, the valve 40 is located within the exhalation chamber 16, although not necessarily.

Associated with the valve 45 is a pressure pad 46 which may be in the form of a circular disc of lightweight material. Pad 46 is pivoted, on a diametral axis thereof, by pivots 47 in a fork 48 on the lever arm 49 which is fulcrum pivoted at 50 to the throat 41. On the opposite side of fulcrum pivot 50 the lever is continued with a short arm 51 to which is attached a counterweight 52.

The counterweighted pressure pad 46 comprises a means which becomes operative in the inverted position of the regulator shown in Fig. 4, to apply closing pressure to the valve 45 as shown in Fig. 4, the weight of the counterweight 52, acting downwardly in this inverted position, lifting the pad 46 into engagement with the valve 45. On the other hand, when the regulator is in the normal position shown in Fig. 3, the counterweight 52, acting in the opposite direction with reference to throat 41, acts to lift the pad 46 away from the valve 45 allowing the latter to open freely without interference.

In the normal position of operation, the valve 45 is below the level of diaphragm 14, and at this lower level there is sufficient differential of hydrostatic pressure over the hydrostatic pressure at the level of inhalation chamber 15 to maintain the valve closed as against the median pressure in the throat 41 (when the diver is neither inhaling nor exhaling). It will be apparent that the pressure in throat 41 will correspond to the pressure in chamber 15 as regulated by the demand valve 31, and this may correspond to the ambient hydrostatic pressure at the level of chamber 15 which is approximately the pressure required for balancing the diver's lung pressure against the ambient water pressure applied against his chest cavity.

In the inverted position of operation shown in Fig. 4, the valve 45 is at a higher level than the inhalation chamber 15 and instead of being subjected to a pressure differential over the ambient hydrostatic pressure in chamber 16, it may have either no hydrostatic pressure differential acting thereon in the closing direction or actually be subjected to a negative differential of pressure in the throat 41 over the ambient hydrostatic pressure in chamber 16 which would cause the valve to remain open and to constantly leak air except for the action of pressure pad 46 which is effective to overcome this pressure differential and maintain the valve 45 closed.

The lever 49, 51, and counterweight 52 are so proportioned that the pressure added by pad 46 is just sufficient to overcome the negative pressure differential and maintain the valve 45 closed in the inverted position with just enough closing pressure so that only a very slight exhalation effort is required on the part of the diver to open the valve 45.

It will now be apparent that the invention makes it possible to adjust the pressure differential so that in the normal position of operation of Fig. 3, the closing pressure differential against exhalation valve 45 over the median pressure in throat 41 and inhalation chamber 15, may be only a very slight differential so that the exhalation effort of the diver in the normal position, required for opening the exhalation valve, may be so slight as to be unnoticeable to the diver. Furthermore it will be apparent that by the proper selection of the load applied by pressure pad 46, the exhalation effort required for opening the valve in either the normal or the inverted position may be at a minimum value and substantially unnoticeable.

The invention also makes it possible to locate the exhalation valve 45 at a distance from the diaphragm 14 along the axis of the regulator outside of the range within which the exhalation valve position is restricted in the conventional breathing apparatus. In this connection, it may be noted that an essential requirement in the invention is this: that the exhalation valve be positioned on the opposite side of the plane of the main diaphragm 14 from inhalation chamber 15 and the inhalation valve mechanism therein. The distance to which the exhalation valve may be spaced below the diaphragm in the normal operating position is of course limited by the fact that as this distance increases, additional exhalation effort will be required to open the valve 45 because of the increase in the hydrostatic pressure differential at the lower level over the pressure in inhalation chamber 15 which is adjusted to the proper value to inflate the diver's lungs at the pressure of the water acting against his lungs. In the engineering of the regulator, as the spacing of the exhalation valve below the diaphragm is increased, the counterbalancing load provided by pad 46 is correspondingly increased so as to compensate for the greater change in differential as between the normal and the inverted positions, and to maintain a slight closing pressure against the valve in the inverted position.

In the form of the invention shown in Fig. 3, the pressure pad 46, in moving away from the valve 45, reaches the limit position shown in Fig. 3 in which it is spaced away from diaphragm 14 as the result of contact of counterweight 52 against throat 41.

As shown in Fig. 6, the counterweight and lever 51, 49 may be so arranged that the pressure pad 46, in the normal position of operation shown in Fig. 3, will engage the diaphragm 14 and apply a slight lifting load to the diaphragm to decrease the amount of inhalation effort required on the part of the diver to open the inhalation demand valve 31. Thus, in the normal operating position, when the diver is in a face-down position with the regulator above his back and the diaphragm therefore balanced by a hydrostatic pressure at a higher level than that at the average level of his lungs, the assistance of the pressure pad in opening the inhalation valve may be utilized to partially offset the added effort of expanding his chest at the lower level. On the other hand, in the inverted position of operation shown in Fig. 4, the pressure pad is out of contact with the diaphragm and the opening of the inhalation valve is facilitated by a somewhat greater hydrostatic pressure against the diaphragm because the regulator is then at a lower level than the average level of the diver's lungs, and since the hydrostatic pressure opposing the expansion of the diver's chest is somewhat less than that acting against the diaphragm, the assistance of the pressure pad in opening the inhalation valve is not needed.

The invention contemplates preferably, an adjustment whereby the effective loading value of the counterweight 52 may be adjusted. Such adjustment may, for example, comprise a threaded connection between weight 52 and lever arm 51 (the latter being in the form of a threaded cylindrical shaft, and weight 52 being internally threaded) and a lock nut 55 for setting the counterweight in any selected position of adjustment axially along lever arm 51.

I claim:
1. In a regulator for controlling flow of breathable gas from a source of such gas under pressure to a fitting that is attachable to a diver's face in communication with his lungs, through an inhalation conduit extending from the regulator to such fitting, and for controlling the escape of exhaled gas from said fitting into a body of water in which the diver is immersed, through an exhalation conduit extending from said fitting to said regulator, in combination: a casing having an inlet for receiving the compressed gas from said source and an inhalation outlet for delivering the gas to said inhalation conduit; a diaphragm cooperating with said casing to define an inhalation chamber in communication with said inlet and outlet, through which the compressed gas is metered from said source to said inhalation conduit in response to suction applied to said chamber by the diver's inhalation; a normally closed demand valve controlling the flow through said inlet; means for opening said demand valve in response to inhalation-induced inward movement of said diaphragm; an exhalation valve disposed on the opposite side of the plane of the diaphragm from said inhalation chamber, said exhalation valve seat defining an escape port facing toward the plane of said diaphragm, and including a valve element adapted to engage said seat to close said escape port, and gravity-responsive means arranged for movement between a position removed from said valve element when the regulator is in a normal upright underwater position wherein said escape valve is below the level of the diaphragm and a position engaging the valve element and applying a closing load thereto for holding it in engagement with said valve seat when the regulator is in an inverted underwater position.

2. In a regulator for controlling flow of breathable gas from a source of such gas under pressure to a fitting that is attachable to a diver's face in communication with his lungs, through an inhalation conduit extending from the regulator to such fitting, and for controlling the escape of expired gas from said fitting into a body of water in which the diver is immersed, through an exhalation conduit extending from said fitting to said regulator, in combination: a casing having an inlet for receiving the compressed gas from said source and an inhalation outlet for delivering the gas to said inhalation conduit; a diaphragm cooperating with said casing to define an inhalation chamber in communication with said inlet and outlet, through which the compressed gas is metered from said source to said inhalation conduit in response to suction applied to said chamber by the diver's inhalation; a normally closed demand valve controlling the flow through said inlet; means for opening said demand valve in response to inhalation-induced inward movement of said diaphragm; an exhalation valve disposed on the opposite side of the diaphragm from said inhalation chamber, said exhalation valve having a throat connected to said exhalation conduit, said throat having a valve seat defining an escape port facing the central area of the outer side of said diaphragm, and including a valve element adapted to engage said seat to close said escape port, a pressure pad disposed in axially opposed relation to said valve element, a pivoted lever carrying said pad, and a counterweight on said lever, arranged to move said pressure pad away from operative association with said valve element when the regulator is in a normal upright underwater position wherein said escape valve is below the diaphragm and to move said pad into engagement with the valve element to lift it into engagement with said valve seat when the regulator is in an inverted underwater position.

3. A regulator as defined in claim 2, wherein said counterweight is arranged to stop against said throat to limit the movement of the pressure pad away from the valve element at a position where the pressure pad remains out of contact with the diaphragm.

4. A regulator as defined in claim 2, wherein said pressure pad is arranged to engage the diaphragm to exert a lifting force thereagainst in the normal position of operation of the regulator.

5. In a regulator for controlling flow of breathable gas from a source of such gas under pressure to a fittting that is attachable to a diver's face in communication with his lungs, through an inhalation conduit extending from the regulator to such fitting, and for controlling the escape of expired gas from said fitting into a body of water in which the diver is immersed, through an exhalation conduit extending from said fitting to said regulator, in combination: a casing including an imperforate section having an inlet for receiving the compressed gas from said source and an inhalation outlet for delivering the gas to said inhalation conduit and an apertured section in opposed relation thereto, said apertured section having an exhalation inlet fitting; a diaphragm interposed between said casing sections and cooperating with said imperforate casing section to define an inhalation chamber in communication with said inlet and outlet, through which the compressed gas is metered from said source to said inhalation conduit in response to suction applied to said chamber by the diver's inhalation, said diaphragm cooperating with said apertured section to define an exhalation chamber adapted to be filled with ambient water acting against the outer side of the diaphragm; a normally closed demand valve controlling the flow through said inlet; means for opening said demand valve in response to inhalation-induced inward movement of said diaphragm; an exhalation valve disposed in said exhalation chamber, having a throat connected to said exhalation inlet fitting, said throat having a valve seat defining an escape port facing in the direction of said inhalation-induced inward movement of said diaphragm, and including a valve element adapted to engage said seat to close said escape port; gravity responsive means including a pressure pad in coaxially opposed relation to said valve element between the same and said diaphragm; and means constraining said pressure pad for movement between a position away from operative association with said valve element to which it is moved when the regulator is in a normal upright position wherein said exhalation valve is below the diaphragm and a position in which it will engage the valve element and lift it into engagement with said valve seat to which position it is moved when the regulator is in an inverted underwater position.

6. In a regulator for controlling flow of breathable gas from a source of such gas under pressure to a fitting that is attachable to a diver's face in communication with his lungs, through an inhalation conduit extending from the regulator to such fitting, and for controlling the escape of exhaled gas from said fitting into a body of water in which the diver is immersed, through an exhalation conduit extending from said fitting to said regulator, in combination: a casing comprising an imperforate casing section having an inlet for receiving the compressed gas from said source and an inhalation outlet for delivering the gas to said inhalation conduit, and an apertured casing section in opposed relation to said imperforate section; a diaphragm interposed between and sealed to said sections, said diaphragm cooperating with said imperforate casing section to define an inhalation chamber in communication with said inlet and outlet, through which the compressed gas is metered from said source to said inhalation conduit in response to suction applied to said chamber by the diver's inhalation, said diaphragm and apertured casing section cooperatively defining an exhalation chamber adapted to be filled with ambient water; a normally closed demand valve controlling the flow through said inlet; means in said inhalation chamber for opening said demand valve in response to inhalation-induced inward movement of said diaphragm; an exhalation-escape valve disposed in said exhalation chamber, including a throat connected to said exhalation conduit, said throat extending along the inner face of said apertured casing section to the center thereof and having a valve seat defining an escape port in opposed spaced relation to the center of said diaphragm, and including a valve element adapted to engage said seat to close said escape port, a pressure pad disposed between said valve element and said diaphragm in axially opposed relation to said valve element, a pivoted lever carrying said pad, and a counterweight on said lever, arranged to move said pressure pad away from operative association with said valve element when the regulator is in a normal upright underwater position wherein said escape valve is below the diaphragm and to move said pad into engagement with the valve element to lift it into engagement with said valve seat when the regulator is in an inverted underwater position.

References Cited in the file of this patent

FOREIGN PATENTS

| | | |
|---|---|---|
| 201,171 | Australia | Feb. 24, 1956 |
| 160,519 | Sweden | Sept. 17, 1957 |